United States Patent [19]
Enning et al.

[11] Patent Number: 5,362,121
[45] Date of Patent: Nov. 8, 1994

[54] SUSPENSION SEATING FOR A VEHICLE BODYWORK

[75] Inventors: Norbert Enning, Denkendorf; Klaus P. Rinke, Wettstetten; Walter Schmale, Lenting; Heinrich Timm, Ingolstadt, all of Germany

[73] Assignee: Audi A.G., Ingolstadt, Germany

[21] Appl. No.: 30,190

[22] Filed: Mar. 25, 1993

[30] Foreign Application Priority Data

Dec. 20, 1990 [DE] Germany .................... 4040976

[51] Int. Cl.⁵ .............................. B62D 25/00
[52] U.S. Cl. .................... 296/204; 280/781; 280/787; 280/796; 52/731.6
[58] Field of Search ............... 296/203–205, 296/25; 254/133 R; 280/107, 762, 781, 787, 796; 52/731.6, 731.7; 72/254; 29/429, 430, 431, 557, 558

[56] References Cited

U.S. PATENT DOCUMENTS

| | | | |
|---|---|---|---|
| 2,021,780 | 11/1935 | Harmon | 280/781 |
| 2,628,812 | 2/1953 | Palazzolo | 254/133 R |
| 2,794,650 | 6/1957 | Schilberg | 296/204 X |
| 4,266,792 | 5/1981 | Sanders et al. | 296/204 X |
| 4,939,828 | 7/1990 | Maier | 72/254 X |
| 4,974,900 | 12/1990 | Destefani et al. | 105/397 X |
| 5,042,395 | 8/1991 | Wackerle et al. | 105/397 |
| 5,088,176 | 2/1992 | Koga | 29/430 |

FOREIGN PATENT DOCUMENTS

| | | | |
|---|---|---|---|
| 0186625 | 7/1988 | European Pat. Off. | |
| 3823418 | 1/1990 | Germany | 280/781 |
| 276201 | 7/1930 | Italy | 280/781 |
| 58-039521 | 3/1983 | Japan . | |
| 59-215231 | 5/1984 | Japan . | |
| 2169312 | 6/1990 | Japan | 72/254 |
| 801159 | 9/1958 | United Kingdom | 280/107 |
| 9002680 | 3/1990 | WIPO . | |

*Primary Examiner*—Dennis H. Pedder
*Attorney, Agent, or Firm*—Thomas C. Feix

[57] ABSTRACT

A holder for attachment to the underside of a vehicle bodywork for use as a suspension seating. The holder consists of a twin-chambered, extruded aluminum section, which is generally L-shaped in cross-section, and includes a first substantially upright box section which forms the support arm, and a second substantially horizontal box section which forms the support seating surface. The upright support arm is secured, preferably by welding, to a longitudinal support member of the vehicle bodywork. The L-bend region of the support arm includes an internal connecting ridge member which further stiffens the holder in the direction of loading. The bottom seating surface is provided with a relief portion for receiving the protruded end associated with a car jack, a straightening bench, a transport frame, etc. In accordance with the method aspect of the invention, the holders are cut at predetermined section widths from a single extrusion such that both left side and right side holders are made from one extrusion.

13 Claims, 1 Drawing Sheet

U.S. Patent   Nov. 8, 1994   5,362,121
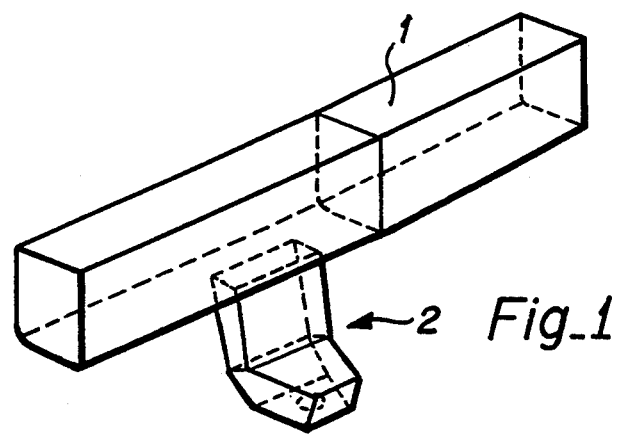
Fig_1
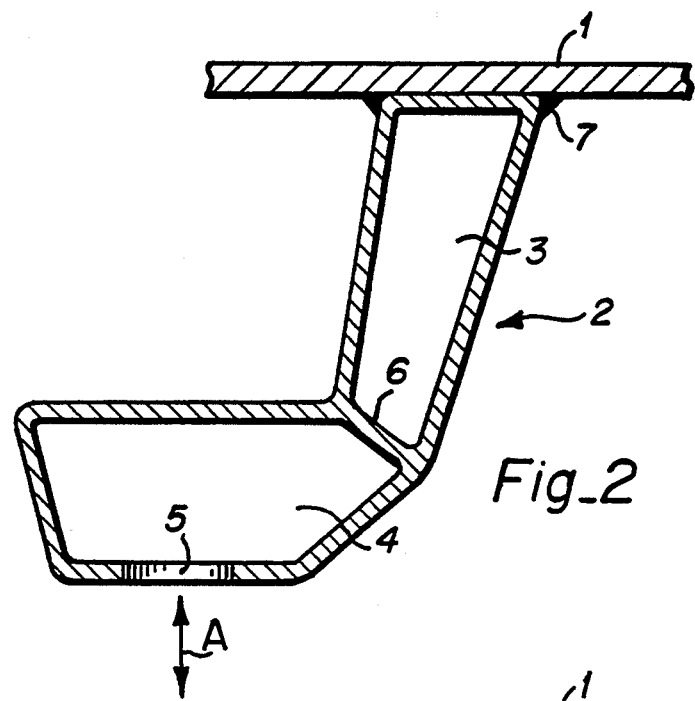
Fig_2
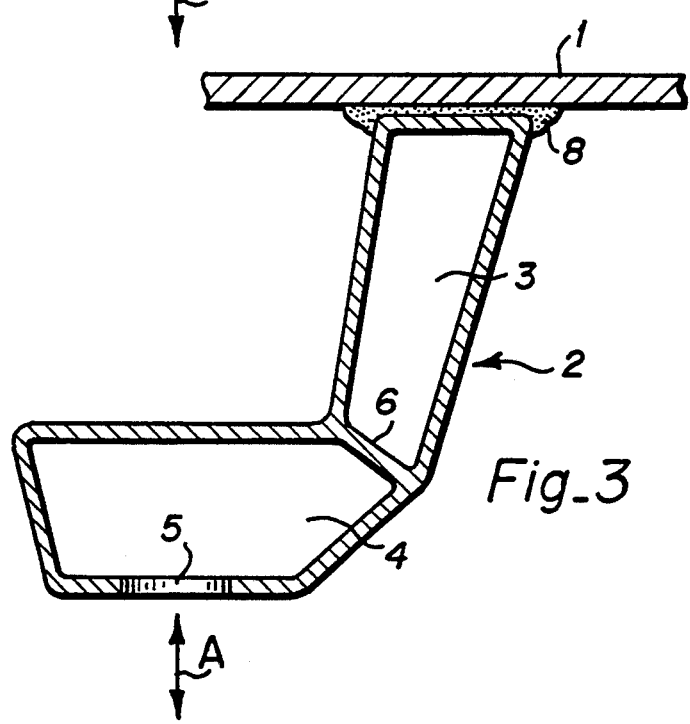
Fig_3

SUSPENSION SEATING FOR A VEHICLE BODYWORK

FIELD

The present invention relates to a holder for attachment to the underside of a motor vehicle bodywork. More particularly, the invention relates to an extruded aluminum holder for use as a suspension seating for a vehicle bodywork and a fabrication method thereof.

BACKGROUND

It is well known in the prior art to mount holders along the underside of a motor vehicle bodywork for use as points of suspension and support such as, for example, for receiving a lifting jack for raising a car in order to change a tire. Examples of other types of attachable holders include support brackets for fastening to a straightening bench, extensions or body openings for use as towing points, and other projections or openings for securing the vehicle during transport. Also, these so-called suspension seatings are indispensable for the mass production of vehicles since they are normally used as mounting points for securing the vehicle bodywork to the transport frame of the assembly line during the production process.

It is a known production technique to fabricate such support and purchase points from several sheet metal pieces which are connected by welding in order to create fastening projections and openings, as well as strengthen and stiffen the surrounding region. At present, such sheet metal solutions are relatively costly, on account of the usually complicated structure of the sheet metal parts, the great variety of pieces, and the time-consuming assembly. Further, it should be noted that typically four of such support seatings or suspension points are needed per car body, and that these four suspension points will typically differ in design depending on their location along the car body and their intended application, thus adding to the high cost of per-piece production.

Accordingly, there is a definite need in the art for an improved support seating attachment for a motor vehicle body which is both simple and inexpensive to produce and which overcomes the problems of the prior art.

THE INVENTION

OBJECTS:

It is therefore an object of the present invention to provide an improved holder for use as a suspension seating which attaches to the underside of a vehicle bodywork and which is simple in construction and inexpensive to manufacture.

It is another object of the present invention to provide a suspension seating for a vehicle bodywork of the type described which is formed from a single aluminum extrusion.

It is a further object of the present invention to provide a method of manufacture for the suspension seating of the type described wherein a single aluminum extrusion is cut into sections of uniform width to form a large number of identically shaped holders for use as a generic suspension seating for mounting to both the left and right side underbody portions of the vehicle bodywork.

These and further objects will become evident from the following written description, drawings, and appended claims.

SUMMARY:

According to a preferred embodiment of the present invention, the above and other objects are accomplished by the provision of a holder which is cut as a short piece from an extruded section, preferably an extruded aluminum section. In this manner, it is possible to produce a large number of simple and inexpensive holders by merely them at desired section widths from a single long extruded section. The extrusion is easily designed with an appropriate geometrical cross-sectional shape to achieve the requisite strength and load capacity for the holder. Furthermore, the same holders can be used for left side and right side installation on the vehicle bodywork.

When compared to a sheet metal solution, the present invention provides an overall simplification of components and a reduction in the number of parts, as well as a greatly simplified assembly process, all of which combine to yield greater cost savings.

A further advantage of the present invention is that the extruded aluminum holders have improved corrosion resistance as compared to their sheet metal counterparts.

In an advantageous embodiment of the invention, the holders are connected to the bottom longitudinal support members of the vehicle bodywork at regular intervals by welding in accordance with familiar techniques for holder mounting and placement. Alternatively, other techniques are possible such as, for example, connection by bolt fasteners or adhesives.

In a particularly advantageous embodiment of the invention, the extruded aluminum holders are used in conjunction with an aluminum bodywork wherein the longitudinal bottom support members also comprise aluminum extruded sections.

In a specific embodiment of the invention, the extruded aluminum holder is generally L-shaped in cross-section and is designed as a twin-chamber extruded section. The holder includes a first, substantially upright box-like chamber which forms the first vertical leg of the L and a second, substantially horizontal box-like chamber which forms the second or base portion of the L. The second box-like chamber serves as the seating or support surface for receiving a car jack. Alternatively, the holder may serve as an attachment point for securing the bodywork to a transport frame, or as an attachment point for fastening the bodywork to a straightening bench.

A configuration having the twin-chamber L-shaped cross-section as described above is easy to design in terms of strength and geometrical requirements. The two box-like sections also form a ridge at their point of union in the region of the bend in the L-shape. This ridge further stiffens the holder in the direction of the applied load.

The holder is secured to the underside of the longitudinal frame member such that its substantially horizontal bottom section is oriented inwardly or in a direction towards the middle of the vehicle. The two box-like chambers of the section are continuously open when viewed in the lengthwise direction of the vehicle. The bottom box-like leg of the holder preferably includes a recess or hole in a bottom wall thereof for receiving the insertion of a support projection associated with a lifting jack, rigging device, straightening bench, transport frame, or the like.

BRIEF DESCRIPTION OF THE DRAWINGS

The invention is best understood with reference to the example shown in the drawings wherein:

FIG. 1 is a perspective view of the holder constructed in accordance with one embodiment of the present invention shown attached to the underside of a longitudinal support member of a vehicle bodywork.

FIG. 2 is a cross-section view of the holder shown in FIG. 1.

FIG. 3 is a cross section view similar to FIG. 2 but showing the use of a glue adhesive as an alternate means for connecting the holder to the underside of a longitudinal support member of a vehicle bodywork.

DETAILED DESCRIPTION OF THE BEST MODE OF THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 is a perspective view of a holder 2 constructed in accordance with one embodiment of the present invention shown connected to the underside of a longitudinal bottom support member 1 of a vehicle bodywork (not shown). The connection of the holder 2 to the bottom longitudinal member 1 is preferably made a weld connection, but it is understood that other connection techniques such as bonding by glue adhesives, riveting, rivet bonding, bolt fasteners, and the like, may be used.

Typically, such holders 2 are arranged on either side of the vehicle toward the front and rear regions, and are used as suspension seatings, when the bodies are connected to the transport frame for an assembly line production. But the holders 2 can also used for other post-production purposes, for example, as jack supports, or as a straightening bench flange, etc.

The invention is described in more detail with reference to FIG. 2. The holder 2 comprises a twin-chamber extruded aluminum section which is generally L-shaped in cross-section. The first box-like or rectangular chamber 3 is substantially upright or vertical and forms a support arm region which is welded along its top end to the longitudinal member 1. In the preferred embodiment, the substantially vertical chamber 3 is angled slightly diagonally inward toward the middle underside of the vehicle bodywork. The second box-like chamber 4 is adjoined to the first box-like chamber 3 and extends approximately horizontally inward and forms a seating area. A borehole 5 is provided in the bottom wall of chamber 4 for receiving protrusions associated with either a car jack, vehicle frame straightening bench, transport frame, and the like.

The juncture of the first chamber 3 and the second chamber 4 is defined by a ridge 6 in the L-bend region of the section. This ridge 6 acts to stiffen the section in the direction of the loading (indicated by double arrow A).

In the embodiment shown in FIG. 2, the holder 2 is connected to the longitudinal member 1 by a weld connection 7. In the alternate embodiment of FIG. 3, the holder 2 is connected to the longitudinal member 1 by a glue adhesive 8.

Thus, the holder as above described accomplishes in an easy manner a very sturdy suspension seating that can be adapted to a particular application for the vehicle underbody by appropriate dimensioning of the section and cut.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A holder on a vehicle bodywork for use as a suspension seating for suspension of the vehicle bodywork comprising in operative combination:

a) an extruded light metal section, being generally L-shaped when viewed in cross-section and including:

i) a first, generally upright box-like chamber forming a vertical leg of the L-shaped holder, said first box-like chamber having an upper surface connected to a bottom longitudinal frame support of the vehicle bodywork;

ii) a second, generally horizontal box-like chamber forming a second leg of the L-shaped holder, said second box-like chamber having a first end connected to said first box-like chamber and a second free end, said second box-like chamber for providing a seating area for receiving an applied load for suspension of the vehicle bodywork; and iii) an interior ridge member disposed separating said first box-like chamber from said second box-like chamber to define a closed twin-chamber extruded light metal section.

2. A holder on a vehicle bodywork as in claim 1 wherein said ridge member is located at an angled L bend region of the twin-chamber extruded section for stiffening the holder in the direction of a load applied to said seating area.

3. A holder on a vehicle bodywork as in claim 2 wherein said second box-like chamber is oriented inwardly towards a middle portion of said vehicle.

4. A holder on a vehicle bodywork as in claim 3 wherein said second box-like chamber includes a recess along a bottom wall thereof adapted for engagement with a lifting jack.

5. A holder on a vehicle bodywork as in claim 1 wherein said second box-like chamber is oriented inwardly towards a middle portion of said vehicle.

6. A holder on a vehicle bodywork as in claim 1 wherein said second box-like chamber includes a recess along a bottom wall thereof adapted for engagement with a lifting jack.

7. A holder on a vehicle bodywork as in claim 2 wherein said second box-like chamber includes a recess along a bottom wall thereof adapted for engagement with a lifting jack.

8. A holder for connection to a longitudinal member of a vehicle bodywork for providing a suspension seating for the vehicle bodywork, comprising in operative combination:

a) an extruded light metal section being generally L-shaped when viewed in cross-section, including:

i) a first, generally upright box-like chamber forming a vertical leg of the L-shaped holder, said first box-like chamber having an upper surface;

ii) means for connecting said upper surface of said first box-like chamber to a light metal longitudinal member of the vehicle bodywork;

iii) a second, generally horizontal box-like chamber forming a second leg of the L-shaped holder, said second box-like chamber having a first end connected to said first box-like chamber and a second free end, said second box-like chamber for providing a seating area for receiving an applied load for suspension of the vehicle bodywork; and iv) an interior ridge member disposed separating said first box-like chamber from said second box-like chamber to define a closed twin-chamber extruded light metal section.

9. A holder on a vehicle bodywork as in claim 8 wherein said ridge member is located at an angled L bend region of the twin-chamber extruded section for stiffening the holder in the direction of said load applied to said seating area.

10. A holder on a vehicle bodywork as in claim 8 wherein said means for connecting includes welding.

11. A holder on a vehicle bodywork as in claim 8 wherein said means for connecting includes glue adhesives.

12. A holder on a vehicle bodywork as in claim 9 wherein said means for connecting includes welding.

13. A holder on a vehicle bodywork as in claim 9 wherein said means for connecting includes glue adhesives.

* * * * *